April 3, 1951 W. C. SANDERS 2,547,344
GAS BY-PASS FOR STORAGE TANK GAUGING PIPES
Filed Oct. 29, 1945 2 Sheets-Sheet 1

W. C. Sanders
INVENTOR.

BY
ATTORNEYS.

April 3, 1951  W. C. SANDERS  2,547,344
GAS BY-PASS FOR STORAGE TANK GAUGING PIPES
Filed Oct. 29, 1945  2 Sheets-Sheet 2
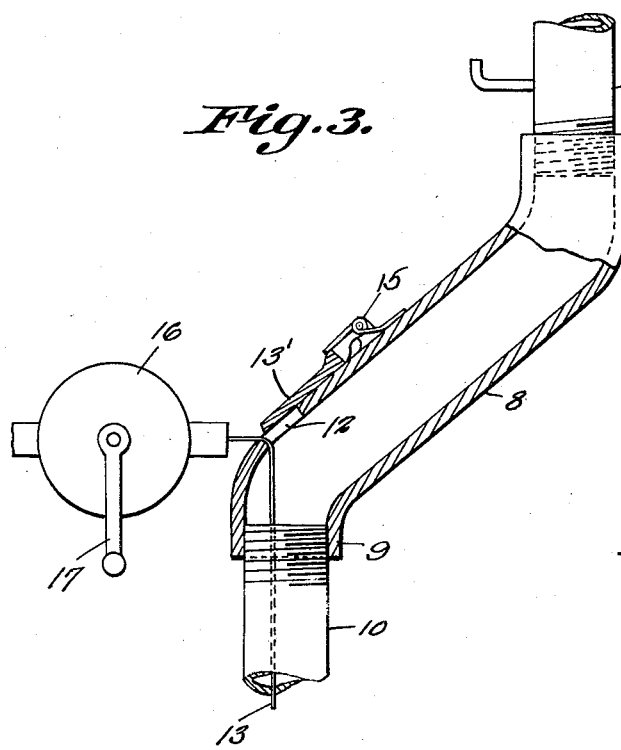
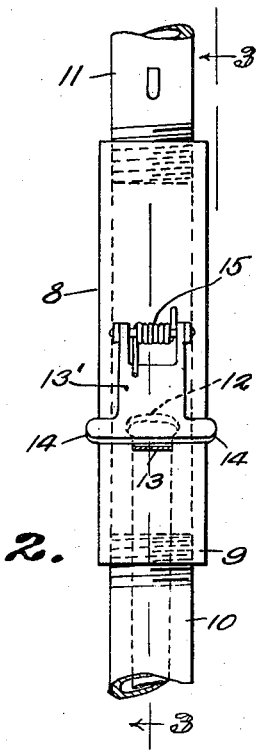
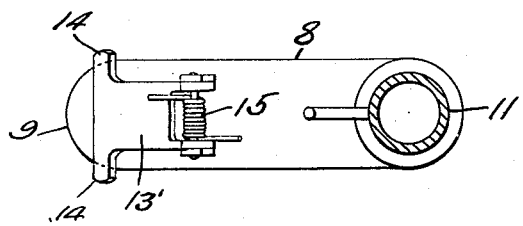
W. C. Sanders
INVENTOR.
BY
ATTORNEYS.

Patented Apr. 3, 1951

2,547,344

UNITED STATES PATENT OFFICE 2,547,344

GAS BY-PASS FOR STORAGE TANK GAUGING PIPES

Wilburn C. Sanders, Grandview, Tex.

Application October 29, 1945, Serial No. 625,236

1 Claim. (Cl. 220—85)

This invention relates to crude oil storage tanks, the object of the invention being to provide means whereby the gas fumes which are liberated from the tank, upon moving the usual gauge opening cover to its open position, will be liberated at a point above the gauger's head, thereby protecting the gauger against the ill effects caused by breathing the gas fumes during the gauging operation.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 2 is a front elevational view of the device.

Figure 3 is a sectional view taken on line 3—3 of Figure 2.

Figure 4 is a plan view of the device.

Figure 1:
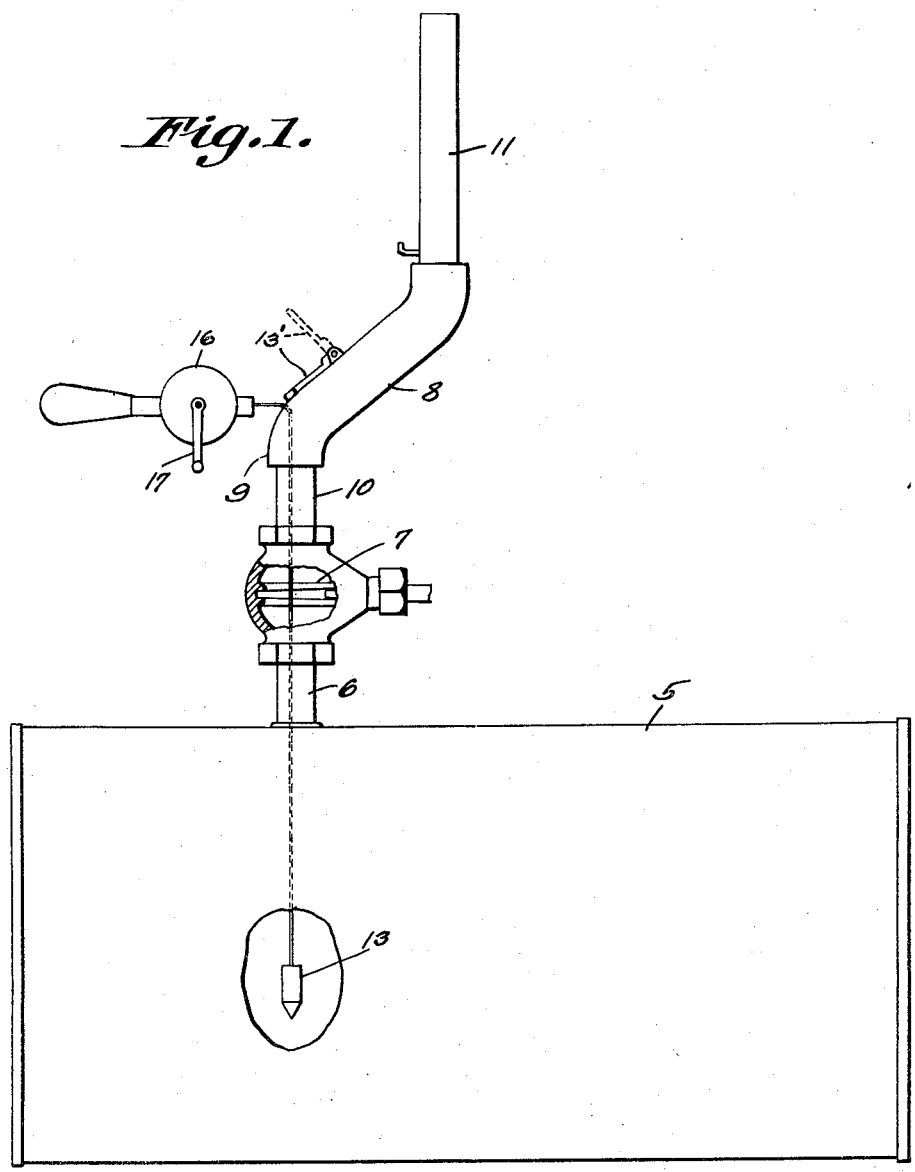
Figure 1 is an elevational view of a gas by-pass pipe, constructed in accordance with the invention.

Referring to the drawing in detail, the reference character 5 designates a crude oil storage tank of the usual and well known construction, the tank being provided with the usual gauge pipe 6, through which the gauge line and bob, are dropped into the tank for gauging purposes. The gauge pipe supports the gate valve 7, through which the gas fumes pass, when the gate valve is moved to its open position so that the gauge line and bob may be dropped thereinto.

The gas fume by-pass pipe, forming the essence of the invention, is indicated by the reference character 8 and as shown, is provided with an offset internally threaded end 9 adapted to be threaded on the upper end of the pipe section 10 which is screwed into the upper end of the valve housing for the valve 7. Due to the angular offset end 9, the main portion of the by-pass pipe 8 is disposed at an oblique angle with respect to the pipe section 10, the upper end of the pipe 8 being disposed vertically where it is internally threaded to receive the pipe section 11 which is of a length to exhaust gas fumes at a point above the head of the gauger who stands on the tank 5, during the gauging operation.

Formed in the upper surface of the pipe 8, is a gauge opening 12 which is so arranged that it is directly over the upper end of the pipe section 10, to permit the gauge line and bob, indicated by the reference character 13, to be dropped vertically into the tank 5. The gauge opening 12 is partially closed by means of the spring-pressed valve 13' which is mounted on the outer surface of the pipe 8, the valve 13' being formed with finger pieces 14, projecting from its sides, by means of which the valve 13' may be swung upwardly, against the action of the coiled spring 15 which acts to normally close the valve 13'.

As shown, the valve is of a length, so that when it is in its closed position, a slight opening is provided between the free end of the valve 13' and one edge of the opening 12, the space being sufficient to permit the passage of the gauge line 13 therethrough. The gauge line is of the usual and well known construction, and is wound on a reel mounted within the reel housing 16, the reel being controlled by means of the handle 17, so that the gauge line may be paid out or wound on the reel, at the will of the gauger, gauging the contents of the tank 5.

From the foregoing it will be seen that due to the construction shown and described, I have provided means which when attached to the usual gauge pipe of a crude oil storage tank, will direct the gas fumes upwardly, liberating them at a point above the head of the gauger, gauging the oil. Since the valve 13' will close the major portion of the gauge opening 12, the gas fumes passing through this small opening will be such that they will not be objectionable to the gauger.

It will of course be understood that during the gauging operation, the gauge line and bob are dropped into the pipe, and the gate valve 7 is operated to release the bob and line so that it will pass into the tank.

In view of the foregoing disclosure, it is believed that further description as to the utility and operation of the device is unnecessary.

What is claimed is:

A gas fume by-pass pipe attachment for gauge pipes of oil tanks, comprising a main pipe section having offset ends, one of the offset ends being secured to the open end of the gauge pipe of an oil storage tank, the pipe attachment being disposed at an oblique angle with respect to the vertical with its discharge end extended upwardly an appreciable distance above the discharge end of the gauge pipe on which the attachment is positioned, said attachment pipe having a gauge opening in the wall thereof in direct alignment with the gauge pipe, through which a gauge line is dropped, a hinged closure mounted on the attachment partially closing the opening around a gauge line dropped therein, and a pipe extending into the free end of the attachment through which gas fumes are discharged an appreciable distance above the end of the gauge pipe.

WILBURN C. SANDERS.

REFERENCES CITED

The following references are of record in the file of this patent:

UNITED STATES PATENTS

| Number | Name | Date |
|---|---|---|
| 794,678 | Martin | July 11, 1905 |
| 1,101,283 | Howd | June 23, 1914 |
| 1,192,134 | Stevens | July 25, 1916 |
| 1,456,334 | Parrott | May 22, 1923 |
| 1,604,874 | Bertschinger | Oct. 26, 1926 |
| 2,069,930 | Talbot | Feb. 9, 1937 |

FOREIGN PATENTS

| Number | Country | Date |
|---|---|---|
| 88,073 | Germany | Date unknown |